Mar. 13, 1923. Re. 15,563
G. H. WILLIAMS
BED CORNER FASTENING
Original Filed Jan. 7, 1915
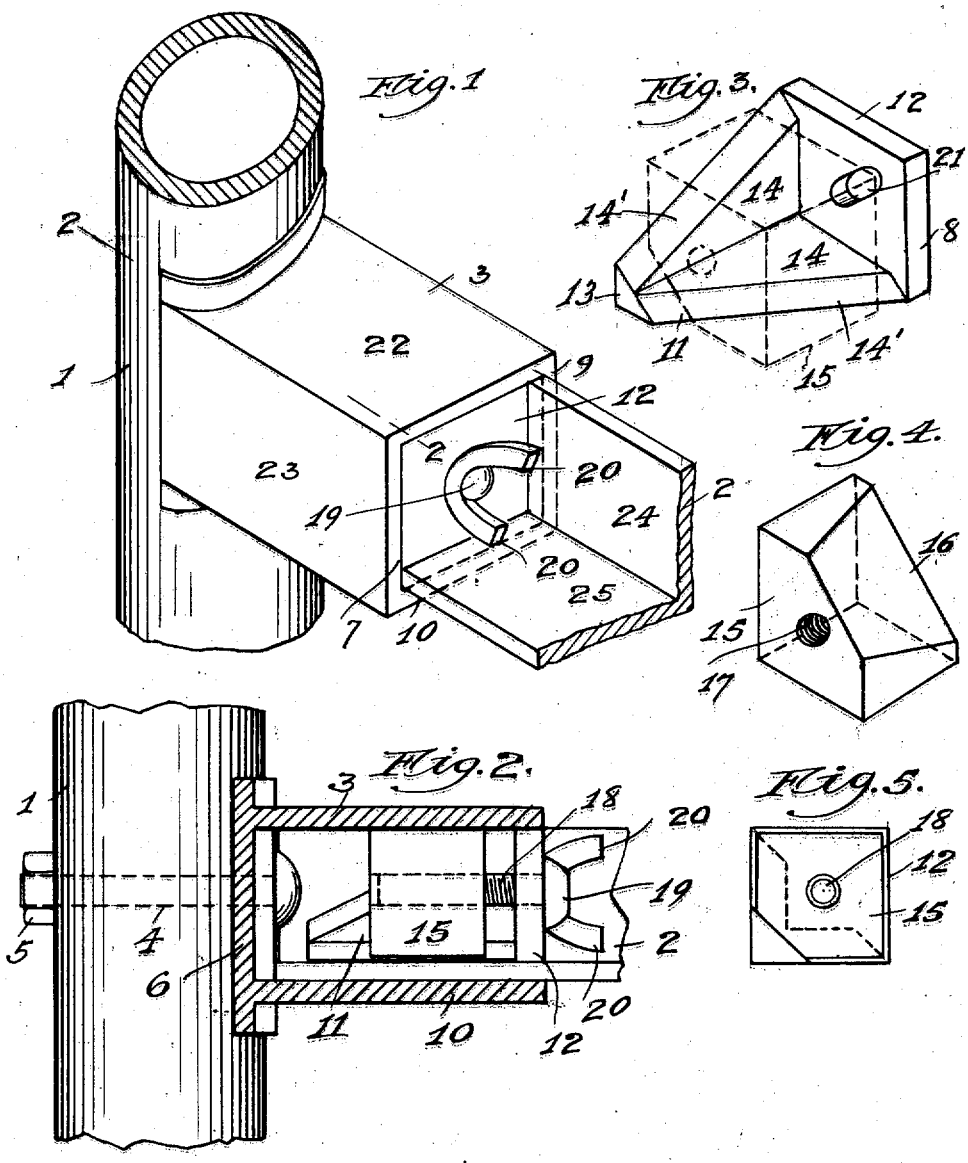
Witnesses,
S. S. Mann
Inventor,
George H. Williams.
By Offield, Towle, Graves & Soano,
Attys.

Reissued Mar. 13, 1923. Re. 15,563

UNITED STATES PATENT OFFICE.

GEORGE H. WILLIAMS, OF PEORIA, ILLINOIS, ASSIGNOR, BY MESNE ASSIGNMENTS, TO SIMMONS COMPANY, OF KENOSHA, WISCONSIN, A CORPORATION OF DELAWARE.

BED-CORNER FASTENING.

Original No. 1,161,177, dated November 23, 1915, Serial No. 1,001, filed January 7, 1915. Application for reissue filed October 28, 1919. Serial No. 334,082.

*To all whom it may concern:*

Be it known that I, GEORGE H. WILLIAMS, a citizen of the United States, residing at Peoria, in the county of Peoria and State of Illinois, have invented certain new and useful Improvements in Bed-Corner Fastenings, of which the following is a specification.

The invention relates to an improvement in beds, and more particularly to the means for locking the corner posts and side rails of the bed together.

The invention has for its primary objects, the provision of an improved corner lock for fastening the side rails of a bed to the corner posts; to provide a bed corner lock in which plain lengths of structural iron or steel may be employed as side rails and detachably and securely locked to the corner posts without the rail ends being specially equipped or fashioned for interlocking purposes; to provide a locking connection which requires no lateral projections or attachments on the rails, thereby materially lessening the cost of manufacturing side rails for metal beds and facilitating nesting thereof for shipment; and to provide a construction enabling the side rails to be arranged and secured in a plurality of optional corner seats.

A specific application of my invention will be described in the following specification, reference being had particularly to the accompanying drawings, in which:—

Fig. 1, is a perspective view showing portions of a corner post and side rail of a bed embodying my invention. Fig. 2 is a vertical sectional view taken on the line 2—2 of Fig. 1. Fig. 3 is a perspective view showing one part of a clamping device in full lines, and a co-operating part in dotted lines. Fig. 4 is a perspective view of a clamping block viewed in inverted position. Fig. 5 is an end view of the complete clamping device.

In the drawings, 1 represents a section of the corner post of a bed, 2 one terminal of a side rail, and 3 a bracket attached to the corner post in any suitable manner, and as each bed corner will be similarly formed, it is considered sufficient for the purpose of clearly disclosing the present invention, to illustrate and describe a single bed corner and its co-operating parts only.

The bracket 3 may be attached to the corner post in any suitable manner, as by means of a bolt 4 passed through the closed end wall thereof and through the corner post, a nut 5 securing the bolt in place. The bracket consists of a hollow casting substantially rectangular in formation with the exception of one end thereof, which is closed as at 6, and of concave formation to fit the tubular formation of the corner post. The end 7 of the bracket is open so as to provide in effect a socket for the reception of the rail end 2, which is preferably of angle iron, and of a dimension in cross section so as to be readily inserted in or withdrawn from the socket.

In order to hold the side rail against separation from the bracket, I employ a wedging device 8 which is insertible into the socket of the bracket and operable to force the rail end into frictional binding contact with any two adjoining sides, as for example, the side and bottom walls 9 and 10 of the bracket. The wedging device comprises what I preferably term a wedge-block 11, having a rectangular head portion 12, and an angular portion 13, comprising relative angular parts 14, the edges of which converge from the head 12 and are beveled in the same diagonal plane, as indicated at 14′—14′ in Fig. 3. Adapted to ride upon the beveled edges of the wedge-block is a binding block 15, which is rectangular in formation with the exception of one corner thereof, as indicated at 16, which is cut away in a plane diagonally of the length thereof, so that one end of the block will be larger than the other, the binding block resting upon the edges 14′—14′ of the wedge block with the large and small ends of both blocks disposed in opposite directions. The binding block 15 is provided with a screw-threaded bore 17, adapted to receive a screw-threaded bolt 18, having a head 19 from which extend ears 20, for manipulating the same by hand. The bolt 18 passes through an elongated slot 21 in the head portion 12 of the wedge-block, so as to permit lateral play thereof, the bolt head 19 bearing against the outer face of the block head 12. By manipulation of the bolt 18, the binding block will be given a combined longitudinal and lateral movement, bringing the same, when arranged as illustrated, in contact with the upper wall 22 and side wall 23 of the bracket, and, due to the resistance of said walls, exerts stress through the wedge-block in a lateral and diagonal direction against the surfaces 24 and 25 of the side rail, thus firmly wedging the latter against endwise movement. By retracting the binding block the side rail may be easily and quickly removed. Also the side rail may be turned so as to present a side surface uppermost and locked in such a position in the same manner as above described, as will be obvious.

It will be observed that the locking means may be carried or located permanently in the socket and does not need to be withdrawn to change the position of the angle iron. The locking means is simply moved in the socket transversely of the angle iron, a distance equal to the thickness of the flange of the angle iron, to permit the end of the angle iron to be inserted in any of the optional corner seats of the socket.

I claim as my invention—

1. A bed corner lock for the side rails of a bed, comprising a socketed member adapted to receive the rail end within the socket, and means operable within the socket and adapted for expansive adjustment to effect a binding engagement between said means, the socketed member, and rail end.

2. A bed corner lock for the side rails of a bed, comprising a socketed member adapted to receive the rail end within the socket, cooperating wedge-shaped elements within the socket having opposing tapered surfaces, and means for drawing said elements together to effect a relative lateral movement thereof, whereby said elements, the socketed member, and the rail end will be brought into frictional binding engagement with each other.

3. A bed having corner posts and side rails, comprising a socketed member adapted to receive the rail end within said socket, a wedge-block within said socket, a binding block carried by the wedge-block, and means for adjusting the binding block, to cause the same to have a combined longitudinal and lateral movement, whereby to force the rail end into binding engagement with the side walls of the socket member.

4. In a bedstead corner-fastening, the combination of an angle iron side rail, a bed post having a socket extending laterally therefrom and provided with a plurality of internal corner seats for the angle iron, and means shiftable bodily in the socket, when the angle iron is removed, for selectively admitting the end of the angle iron in either of the corner seats and expansively adjustable in either shifted position to clamp the angle iron in the selected corner seat.

5. A device for fastening an angle iron side rail endwise to a bed-post, comprising a socket on the bed-post, having a plurality of corner seats, means in the socket adapted to be optionally withdrawn laterally from either corner seat to afford an L-shaped space between either corner seat and said means for receiving the end of the angle iron, and an operating member for expansively adjusting said means in either withdrawn position to contract the L-shaped opening and thereby clamp the angle iron in the socket.

6. In a bedstead corner fastening, the combination of a bed-post having a socket rigid therewith and extending laterally therefrom, and provided with a pair of optional internal corner seats, an angle iron adapted to be fitted in either of said corner seats, and a wedging means, located in the socket to permit insertion of the angle iron in either of said seats, and expansively adjustable to optionally clamp the end of the angle iron in either of said corner seats.

7. In a bedstead corner fastening, the combination of an angle iron, a bed-post having a socket extending laterally therefrom provided with a plurality of corner seats, a clamp member in the socket and a bolt extending through said clamp member for expanding the latter in different directions to force the angle of the rail optionally in the corner seats of the socket.

8. In a bedstead corner fastening, the combination of an angle iron, a bed-post having a socket extending laterally therefrom and having optional corner seats for the end of the angle iron, a screw extending into the socket, and locking means mounted on the screw and expansively adjustable thereby to bear against both flanges of the angle iron when the latter is inserted in either seat and thereby clamp the end of the angle iron optionally in said seats.

9. In a corner lock for take-down bedstead frames, the combination of a bed-post provided with a laterally extending socket, an angle iron side-rail having its end removably located in said socket, said socket being provided with upper and lower optional corner seats to receive the end of the angle iron therein, a member for applying pressure to clamp the angle iron in either seat and expansively adjustable means in the socket separable from the corner seats and adapted to have the angle iron inserted therebetween, said means being adapted to resolve the applied pressure into two components acting respectively towards the two flanges of the angle iron, for forcing the angle iron diagonally into either of the optional corner seats, and bodily shiftable, transversely of the angle iron, to permit transfer of the angle iron from either seat to the other seat.

10. In a bedstead corner fastening, the combination of an angle iron, a bed-post having a socket extending laterally therefrom and provided with a corner seat, adapted to receive the end of the angle iron therein, a clamp member in the socket and a bolt extending through said clamp member, for expanding the latter in different directions, to force the angle of the rail in the angle of the seat.

11. In a bedstead corner fastening, the combination of a post, having a socket extending laterally therefrom, an angle iron adapted to have the end thereof inserted in the socket, a threaded adjusting member extending in the socket, and a plurality of interengaging wedge members, expansively operable by said threaded member for clamping the end of the angle iron in the socket.

12. In a bed corner fastening, the combination of a bed-post provided with a socket, an angular side rail adapted to be optionally inserted in the socket in a plurality of angular positions, and clamping means comprising a plurality of parts, having a wedge engagement with one another, and a bolt extending through said clamping means for expansively operating said parts to clamp the end of the angular side rail in the socket.

GEORGE H. WILLIAMS.